Figure 1:
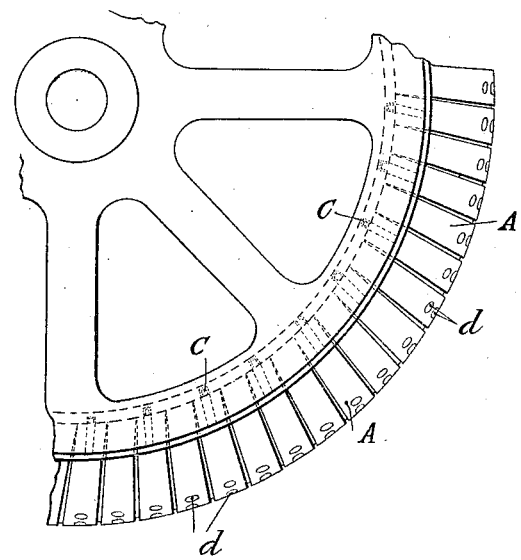

P. G. PAVLIDÉS & L. F. FERALDI.
FLEXIBLE METALLIC TIRE FOR MOTOR AND OTHER VEHICLES.
APPLICATION FILED SEPT. 27, 1916.

1,271,609.

Patented July 9, 1918.

P. G. PAVLIDÉS & L. F. FERALDI.
FLEXIBLE METALLIC TIRE FOR MOTOR AND OTHER VEHICLES.
APPLICATION FILED SEPT. 27, 1916.
1,271,609.
Patented July 9, 1918.
2 SHEETS—SHEET 2.
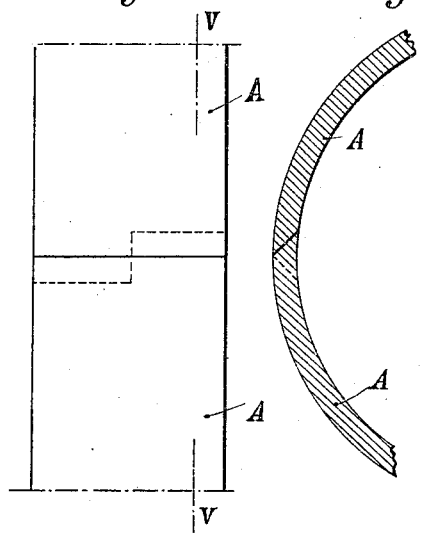
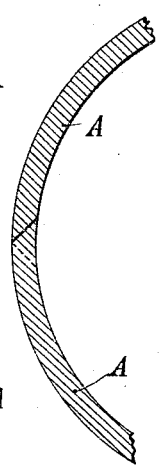
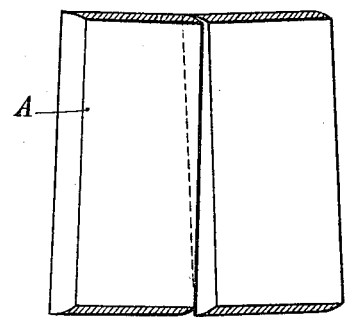
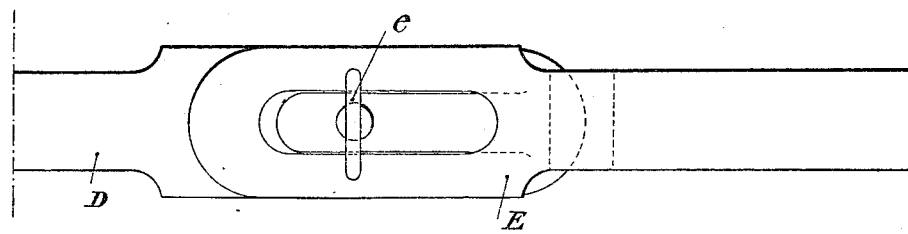
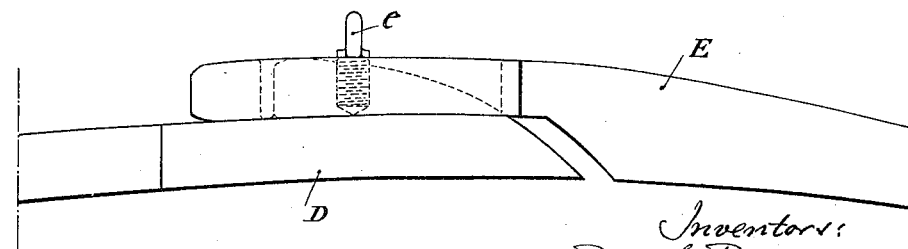

UNITED STATES PATENT OFFICE.

PAUL G. PAVLIDÉS AND LOUIS F. FERALDI, OF PARIS, FRANCE.

FLEXIBLE METALLIC TIRE FOR MOTOR AND OTHER VEHICLES.

1,271,609.  Specification of Letters Patent.  Patented July 9, 1918.

Application filed September 27, 1916. Serial No. 122,325.

*To all whom it may concern:*

Be it known that we, PAUL G. PAVLIDÉS, subject of Greece, residing at 39 Avenue de l'Opéra, Paris, France, and LOUIS F. FE-RALDI, citizen of the Republic of France, residing at 47 Avenue de la Motte-Piquet, Paris, France, have invented certain new and useful Improvements in Flexible Metallic Tires for Motor and other Vehicles, of which the following is a specification.

The present invention relates to elastic metal vehicle tires which shall take the place of the ordinary pneumatic tire made of rubber and have the advantage of much greater durability, therefore being cheaper.

Our new tire consists in a helical spring formed of a band of steel of suitably rolled profile and bent into a partly telescoping helix. The two extremities of this spring are so jointed that the whole forms an annulus which is placed in the channeled rim of a wheel and is held therein in place by a steel band passing through the interior of the spring and having its ends secured together.
A tire so made, because of the natural elasticity of the steel and the suppleness of the spring by reason of the latter's shape, is capable of still greater suppleness and still greater efficiency in fulfilling its functions due to the particular manner of its attachment to the wheel rim, which constitutes the principal characteristic of this invention.

Each second convolution of the steel spring carries a bronze stud which enters a transverse curved groove (Figure 2) provided in a bronze fitting secured by screws in the channel of the wheel rim. The grooves which are indicated by the dotted lines in Fig. 1 are parallel to the convolutions thus permitting each convolution of the spring to easily displace itself in the channel of the rim, while the spring as a whole is carried along with the wheel.

Further, by reason of the continuity of the spring, and the facility of displacement of its convolutions as stated, each convolution, or two or three adjacent convolutions can, when subjected to external pressure, diminish their diameter, while the convolutions preceding or following can unbend thus increasing their diameter. Thus, on encountering a more or less prominent irregularity of the road-way or stones, two or three convolutions will, under the abrupt pressure, diminish in diameter to overcome the obstacle, while the preceding or following convolutions will, of course, increase in diameter, thus coming in touch with the ground and in part, at least, relieving the convolutions which are at the time subjected to the abrupt strain.

Thus, a metal tire, stout, yet flexible and yielding is produced capable of adapting itself to the irregularities of the ground and roughnesses in the road surface. Such a tire, therefore, will easily absorb jolts and vibrations making driving in a carriage or motor vehicle easy.

Figure 2:
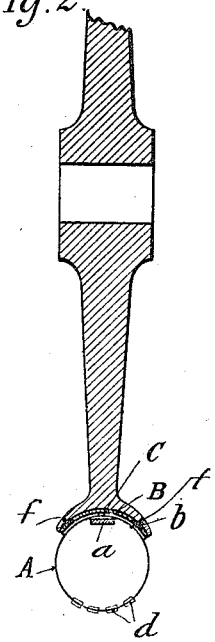
Figure 3:
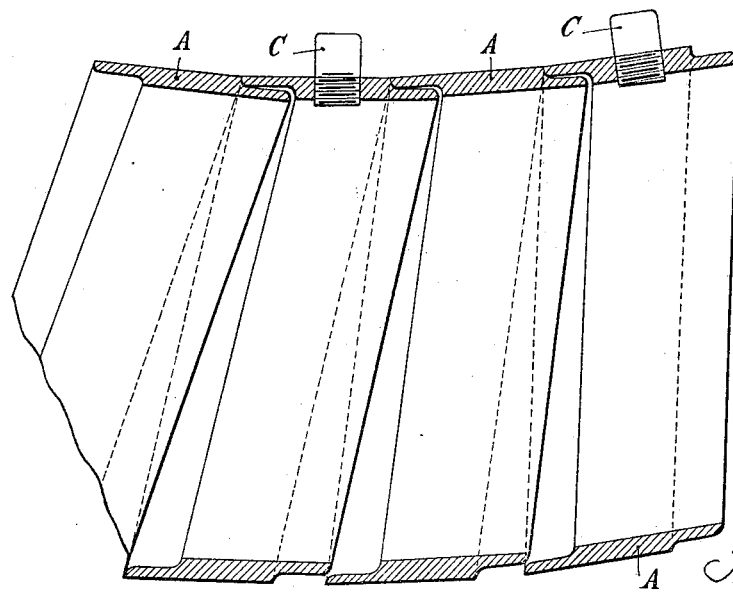

One construction of our invention is shown in the drawing, in which Fig. 1 is a side elevation of a portion of the wheel provided with the new tire; Fig. 2 is a transverse section through the wheel, showing the manner of securing the tire to the rim of the wheel; Fig. 3 is a section of the helical spring showing its profile and the partial telescoping of its convolutions; Figs. 4 and 5 are respectively a plan and a section showing the joint of the two extremities of the spring, the section being along line V—V in Fig. 4; Fig. 6 shows in section a spring for light vehicles; Figs. 7 and 8 show respectively in plan and elevation the lock for the band for retaining the spring on the wheel rim.

A is the helical spring with its telescoping convolutions. B (Fig. 2) is the bronze lining or fitting and C are the bronze studs. According to Fig. 2 the spring A is provided with rivets *d* for the double purpose of permitting the spring to better grip the road-surface when flattened and consequently also to serve as an antiskid device.

*a*, Fig. 2, is the metal band which forms the retainer for the helical spring to prevent it from leaving the rim under the influence of centrifugal force. The bronze lining B which is fastened to the rim by rivets *f* is provided with transverse grooves *b*. These grooves can also be made in the rim itself, which, of course, simplifies and cheapens the construction, besides economizing in weight.

According to Fig. 3 the convolutions of the spring at the inside part of the annulus fit one into the other, every second convolution being held in the wheel rim by the studs C.

According to Figs. 4 and 5, the two ends of the spring are rabbeted forming two offset edges which are beveled in opposite directions, the edges on the one end overlapping and fitting the corresponding edges on the other end of the spring, insuring the continuity of the spring and forming a loose joint which, under compression, works in the axial plane of the wheel.

The spring shown in Fig. 3 is intended for heavier vehicles, while the spring shown in Fig. 6 is for lighter vehicles.

Figs. 7 and 8 show the manner of fastening together the ends of the metal band *a* for retaining the spring on the rim. This band carries at its one end a tenon, and at its other end a mortise. It is curved like a ring before being inserted with a diameter slightly less than the interior diameter of the annulus formed by the spring. When the band has been placed inside the annulus and the latter is closed, the end of the band adjoining the extremity E overlaps the inclined plane of the extremity D, the mortise in the one end of the band registering with the tenon in the other end. Then by pushing aside two adjacent convolutions of the spring over the place where the ends of the band are secured together, a screw *e* can be introduced into a hole formed in the tenon. When the head of this screw is transversely displaced as shown in Figs. 7 and 8, the tenon can not escape from the mortise under centrifugal force.

We claim as our invention:

In combination with a wheel rim, an elastic metal tire comprising a continuous helical spring formed of a steel band placed in the wheel rim, the single convolutions of said spring partly telescoping into each other, alternate convolutions being each provided with a stud loosely entering a transverse groove in the wheel rim, and a metal band provided with interlocking ends for securing the spring to the wheel rim.

In testimony whereof we affix our signatures in presence of two witnesses.

PAUL G. PAVLIDÉS.
LOUIS F. FERALDI.

Witnesses:
HENRI MORIN,
CHAS. P. PRESSLY.

Copies of this patent may be obtained for five cents each, by addressing the "Commissioner of Patents, Washington, D. C."